United States Patent
Dowlatkhah et al.

(10) Patent No.: US 11,051,226 B1
(45) Date of Patent: Jun. 29, 2021

(54) FACILITATING ENABLEMENT OF INTELLIGENT SERVICE AWARE ACCESS UTILIZING MULTIACCESS EDGE COMPUTING IN ADVANCED NETWORKS

(71) Applicants: AT&T Intellectual Property I, L.P., Atlanta, GA (US); AT&T Mobility II LLC, Atlanta, GA (US)

(72) Inventors: Sangar Dowlatkhah, Cedar Hill, TX (US); Zhi Cui, Sugar Hill, GA (US); Brian Keller, Milton, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 16/714,405

(22) Filed: Dec. 13, 2019

(51) Int. Cl.
*H04W 36/00* (2009.01)
*H04W 36/32* (2009.01)
*H04W 4/50* (2018.01)

(52) U.S. Cl.
CPC ............ *H04W 36/32* (2013.01); *H04W 4/50* (2018.02); *H04W 36/0011* (2013.01)

(58) Field of Classification Search
CPC ..... H04W 36/32; H04W 4/50; H04W 36/011; H04W 88/02; H04W 8/245; H04M 1/72519; H04M 1/72522
USPC .................................... 455/440, 550.1, 418
See application file for complete search history.

(56) References Cited

U.S. PATENT DOCUMENTS

| | | | | |
|---|---|---|---|---|
| 9,721,465 | B2* | 8/2017 | Iwase | H04N 21/41407 |
| 10,050,732 | B2* | 8/2018 | Treyer | H04J 14/0278 |
| 10,257,276 | B2* | 4/2019 | Motwani | G06F 11/1092 |
| 2012/0008627 | A1* | 1/2012 | Chen | H04W 8/26 370/392 |
| 2015/0095810 | A1* | 4/2015 | Rapoport | G06F 3/0484 715/762 |
| 2018/0300051 | A1* | 10/2018 | Kim | G06F 3/0416 |
| 2019/0104458 | A1* | 4/2019 | Svennebring | H04W 40/18 |
| 2019/0288939 | A1* | 9/2019 | Dong | H04L 45/021 |
| 2020/0252838 | A1* | 8/2020 | Akdeniz | H04W 4/70 |

\* cited by examiner

*Primary Examiner* — Danh C Le
(74) *Attorney, Agent, or Firm* — Amin, Turocy & Watson, LLP

(57) ABSTRACT

Facilitating enablement of intelligent service aware access utilizing multiaccess edge computing advanced networks (e.g., 5G, 6G, and beyond) is provided herein. Operations of a method can comprise determining a network service being utilized by a first user equipment device has not been instantiated at a distributed network device and based on the first user equipment device approaching a service range of the distributed network device. The method also can comprise deploying the network service, as a microservice, at the distributed network device prior to the first user equipment device entering the service range of the distributed network device. Further, the method can comprise removing the network service from being deployed at the distributed network device based on a determination that the first user equipment device is no longer within the service range of the distributed network device and a second user equipment device is not utilizing the network service.

20 Claims, 10 Drawing Sheets

US 11,051,226 B1

FACILITATING ENABLEMENT OF INTELLIGENT SERVICE AWARE ACCESS UTILIZING MULTIACCESS EDGE COMPUTING IN ADVANCED NETWORKS

TECHNICAL FIELD

This disclosure relates generally to the field of mobile communications and, more specifically, to edge computing in Fifth Generation (5G), Sixth Generation (6G), or other advanced networks.

BACKGROUND

Communications networks have traditionally been implemented as core centric solutions and are transitioning from the core centric solution to a core distributed solution. For example, 5G networks are moving towards this decentralized core. 6G networks will be fully decentralized, and all the core functionality will be at the edge of the network, together with the services needed from the network to render its services. While utilizing the edge computing and moving a large amount (e.g., almost all, if not all) processing power to the edge of the network, including some of the core functionalities, there is a void or imbalance in governing such a dramatic change of activities as well as fundamental functionality changes from service to access network original intent. Accordingly, unique challenges exist to provide management of edge computing devices associated with forthcoming 5G, 6G, and/or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
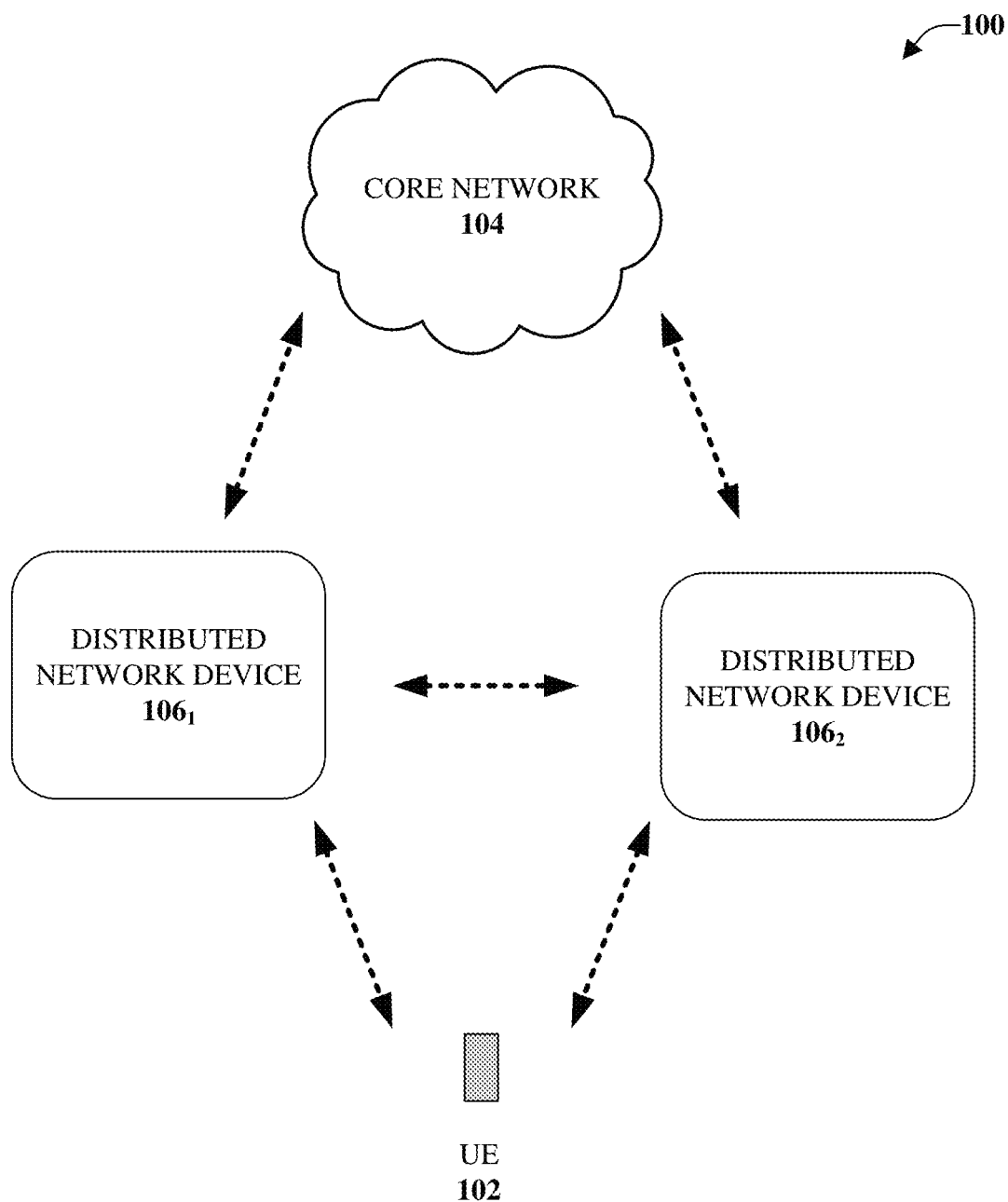
FIG. 1 illustrates an example, non-limiting, wireless communication system the utilizes edge computing in accordance with various aspects and embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate enablement of intelligent service aware access utilizing multiaccess edge computing in advanced networks. Every part of a communications network, from core to transport to access, can have some software enabled network capability that, according to demand and supply rules, can increase or decrease the resources to the incoming or outgoing network traffic. However, while utilizing the edge computing and moving a large amount (if not all, or almost all) processing power to the edge of the network, including some of the core functionalities, there can be a void or imbalance in governing such a dramatic change of activities as well as fundamental functionality changes from service to access network original intent. As discussed herein, microservices can be able to reserve or even change the delegation of resources to be able to accommodate that the networks need to be more service aware and intelligent. The disclosed aspects relate to providing a top down and bottom up intelligent governance to accommodate a streamlined and efficient solution.

According to an embodiment, provided is a system that can comprise a processor and a memory that stores executable instructions that, when executed by the processor, facilitate performance of operations. The operations can comprise determining a mobile device is moving toward a service range of a distributed network device. The distributed network device can be included in a communications network that employs decentralized core services. The operations also can comprise receiving information indicative of a network service utilized by the mobile device. The network service can be determined to be a service that is unavailable at the distributed network device. Further, the operations can comprise instantiating the network service at the distributed network device prior to the mobile device entering the service range of the distributed network device. The distributed network device can facilitate provision of at least a portion of the decentralized core services to the mobile device.

In some implementations, the determination can be based on receiving a connection request from the mobile device.

Further, the connection request can comprise information indicating a type of the mobile device and the network service.

According to some implementations, the distributed network device can be a first distributed network device and instantiating the network service can comprise deploying a temporary version of the network service to the first distributed network device. The temporary version can enable a communication handover of the mobile device from a second distributed network device to the first distributed network device. Further to these implementations, the operations can comprise determining the mobile device has left the service range of the first distributed network device and removing the temporary version of the network service from the first distributed network device.

Instantiating the network service at the distributed network device can comprise, according to some implementations, instantiating the network service as a microservice offered by the communications network.

According to some implementations, the operations can comprise determining a first application and a second application are executing on the mobile device. The operations also can comprise enabling a first communication of the first application via a first access technology based on a first microservice employed for the first application. Further, the operations can comprise enabling a second communication of the second application via a second access technology, different from the first access technology, based on a second microservice employed for the second application. Further to these implementations, the operations can comprise reducing network congestion within the communications network based on the enabling the first communication of the first application and the enabling the second communication of the second application. Additionally, or alternatively, enabling the first communication can comprise enabling a first virtual session between the distributed network device and the mobile device. Enabling the second communication can comprise enabling a second virtual session between the distributed network device and the mobile device.

In some implementations, the distributed network device an be selected from a group of distributed network devices that geographically divide an amount of information communicated within the communications network. The distributed network device can comprise a software defined networking management function. In an example, the distributed network device can be an edge computing device.

In another embodiment, provided is a method that can comprise determining, by a system comprising a processor, that a network service being utilized by a first user equipment device has not been instantiated at a distributed network device and based on the first user equipment device approaching a service range of the distributed network device. The method also can comprise deploying, by the system, the network service, as a microservice, at the distributed network device prior to the first user equipment device entering the service range of the distributed network device. Further, the method can comprise removing, by the system, the network service from being deployed at the distributed network device based on a determination that the first user equipment device is no longer within the service range of the distributed network device and that a second user equipment device is not utilizing the network service.

In some implementations, the distributed network device is a first distributed network device and the method further can comprise facilitating, by the system, a communication handover of the first user equipment device from a second distributed network device to the first distributed network device based on deploying of the network service prior to the first user equipment device entering the service range of the first distributed network device.

According to some implementations, the method can comprise enabling, by the system, a first virtual session between the first user equipment device and the distributed network device, wherein a first application is executed via the first virtual session. The method also can comprise enabling, by the system, a second virtual session between the first user equipment device and the distributed network device, wherein the second virtual session and the first virtual session are different virtual sessions. A second application can be executed via the second virtual session. Further to these implementations, enabling the first virtual session can comprise enabling a first access technology, and enabling the second virtual session can comprise enabling a second access technology different from the first access technology. The first access technology and the second access technology can be concurrently employed by the first user equipment device.

Deploying the network service can comprise, according to some implementations, enabling at least some of decentralized core services to the first user equipment device based on temporarily deploying, by the system, the network service at the distributed network device.

Another embodiment can relate to a machine-readable storage medium, comprising executable instructions that, when executed by a processor, facilitate performance of operations. The operations can comprise determining policies associated with scalable consumption demands in a communications network that employs decentralized core services. The operations also can comprise determining that a service is expected to be utilized in the communications network during a defined period, wherein the service is not currently instantiated on a network device that provides the decentralized core services. Further, the operations can comprise deploying the service on the network device prior to a time that the service is expected to be utilized in the communications network and based on the policies. The scalable consumption demands can comprise microservices available within the communications network. The network device can provide at least a group of the decentralized core services to the user equipment device.

According to some implementations, determining that the service is expected to be utilized in the communications network during the defined period can comprise determining a user equipment device is moving within a service range of the network device. Further, determining that the service is expected to be utilized in the communications network during the defined period can comprise receiving information indicative of a network service utilized by the user equipment device. The network service can be determined to be the service that is not currently instantiated on the network device.

With reference initially to FIG. 1, illustrated is an example, non-limiting, wireless communication system 100 the utilizes edge computing in accordance with various aspects and embodiments described herein. As illustrated a User Equipment device (UE device 102) can connect to a mobile network (e.g., a core network 104) via one or more distributed network devices, illustrated as a first distributed network device $106_1$ and a second distributed network device $106_2$. It is noted that although only two distributed network devices and a single UE device are illustrated for purposes of simplicity, any number of distributed network devices and/or UE devices can be utilized in an edge computing system.

According to some implementations, the UE device 102 can connect to the core network 104 via one or more distributed network devices as the UE device 102 moves through the communications network. For example, as the UE device 102 moves, the UE device 102 can be handed off from the first distributed network device 106$_1$ to the second distributed network device 106$_2$.

As discussed herein, a solution for advanced networks, including 6G networks, is referred to as mobile edge computing. There can be microservices at the edge of the network that utilize the MAC processing power to render the services. Since the core is being decentralized, the functionality moves to the edge of the network, where the microservices are deployed. This can be thought of as a client of the service layer that has the specific services that subscribers are evoking. In the example of FIG. 1, the microservices can be selectively deployed on the first distributed network device 106$_1$ and/or the second distributed network device 106$_2$.

As mentioned, as the network and service architecture changes and some network functionalities move to the edge of the network, the service layer can become more interactive with delegating resources from access, transport to the core network. At the edge of the network accompanied by other intelligent functionalities such as RIC (Radio Intelligent Controller) there is a need for a dynamic real-time policy engine to process all the incoming parameters. Such parameters include, but are not limited to, network load to microservice controllers changing requirements to the new access technologies to put out new policies in-line with a real time changes in subscriber (e.g., users of the UE devices, including the UE device 102) and network needs. Even more importantly is a service aware SDN controller, as the name implies, it needs to not only know in real-time what services are being utilized by the subscribers but also predict what other enhancement or upgrade services are being triggered ahead of time to give a seamless experience to the users.

Figure 2:
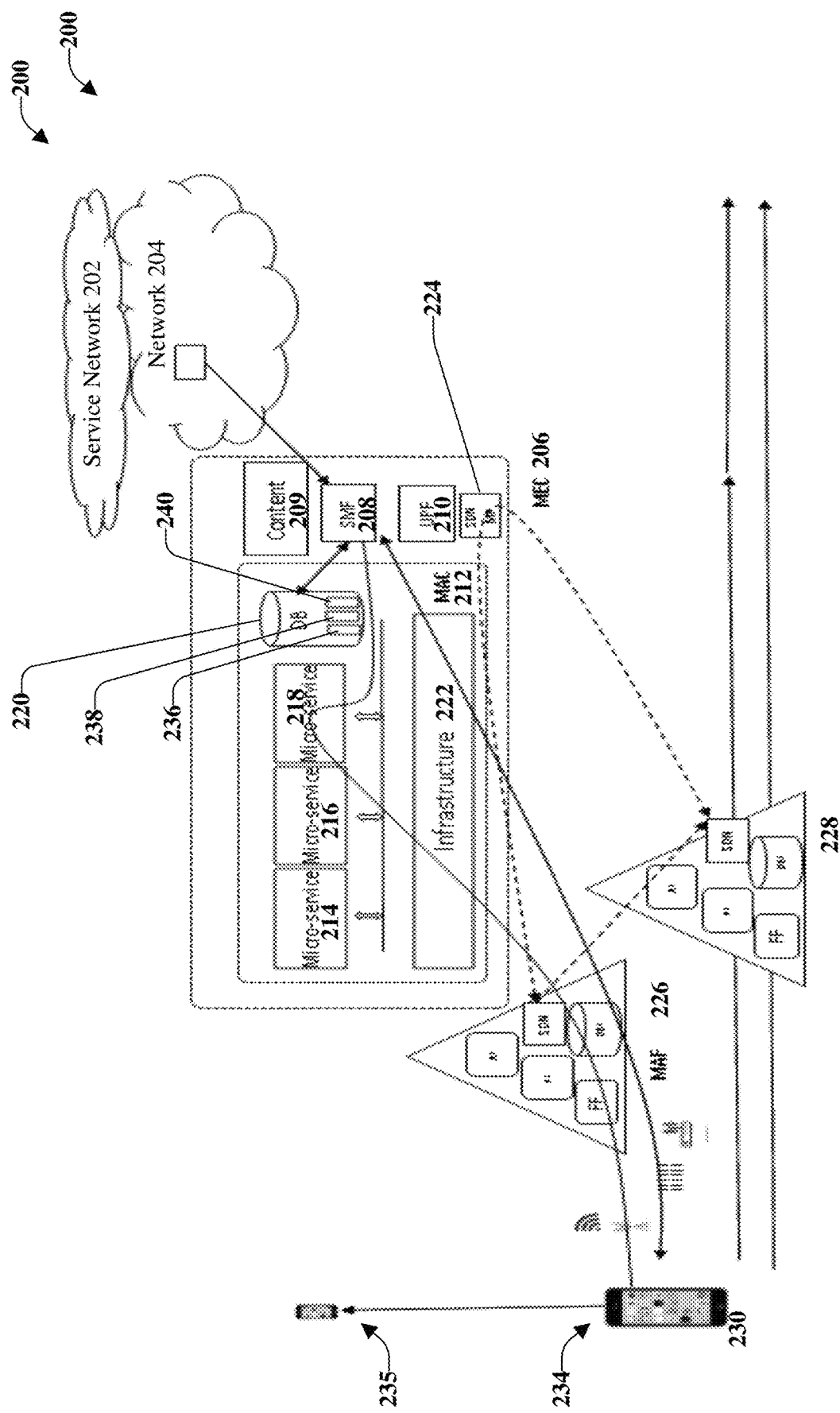
FIG. 2 illustrates an example, non-limiting, communications network that facilitates enablement of intelligent service aware access utilizing multiaccess edge computing in accordance with various aspects and embodiments described herein.

FIG. 2 illustrates an example, non-limiting, system 200 that facilitates enablement of intelligent service aware access utilizing multiaccess edge computing in accordance with various aspects and embodiments described herein. Repetitive description of like elements employed in other embodiments described herein is omitted for sake of brevity.

The system 200 comprises a service network 202 and a network. As illustrated, the service network 202 and the network 204 can be implemented in a cloud computing architecture. According to some implementations, the network 204 can be a 6G network. However, it is noted that the disclosed aspects can be implemented in other networks, including a 5G network or other advanced networks.

Also illustrated is a Mobile Edge Computing (MEC) device 206. At least a portion of a Session Management Function (SMF) 208 can be supported in both the network 204 ad the MEC device 206 (as indicated by the arrow). The MEC device 206 can also include various content 209, and a User Plane Function (UPF) 210.

Further, the MEC device 206 can comprise one or more Multi access Controllers (MAC), one of which is illustrated as MAC 212. The MAC 212 can comprise one or more microservices, illustrated as a first microservice 214, a second microservice 216, and a third microservice 218. Also included in the MEC device 206 is a database 220 communicatively coupled to the SMF 208. The MEC device 206 can also include an infrastructure 222 to enable the edge computing as discussed herein.

In addition, the MEC device 206 can comprise a Software Defined Networking Management Function (SDN MF 224). As illustrated one or more Multi Access Functions (MAFs) can be implemented and are illustrated as a first MAF 226 and a second MAF 228. It is noted that Access network Topology (MAF MPA and understanding what access technology is connected each MAF) and Ecomp function/MS storage can be instantiated as needed.

The MAFs (e.g., the first MAF 226 and the second MAF 228) can include, but are not limited to, an Application Function (AF), a Policy Function (PF), a Filter Function (FF), a Data Buffering Function (DBF), and an SDN controller. The AF is a related application that can be ported/cascaded to other MAF's following physical movement of a subscriber (e.g., the UE device 108). The FF can filter the related data to the core/service, depending on the policies and Service Level Agreements (SLAs). The PF information can be updated with SLA (e.g., dynamic changes made to the policy via the user and/or carrier can be transferred/updated in the PF database). The PF information can also be updated with other variables, such as user defined and/or carriers core policy database. Service enabled filters and utilization percentage (such as stream Video, XR, and so on.) This can be performed by SDN and service collaboration through SDN Manager function located in the network, which can control SDN in the core as well as SDN in the transport and the access network. In addition to this, the MAF function (e.g., the first MAF 226 and the second MAF 228) can also have an SDN enabled architecture. The SDN enabled architecture can facilitate, inline, a dynamic mobility of the services with real-time deployment of applications and resources as the UE device 230 moves from a first location 234 to another location (e.g., a second location 235 as the MAF coverage is limited and handover to new MAF can occur in real time.

By way of example and not limitation, a user of the UE device 230 is driving down the street. In some cases, the user could be associated with more than one UE device. For example, the user might be receiving information through the vehicle, such as receiving on a screen (display) or on the windshield (or other portion of the vehicle), driving direction information, which could be overlaid on an electronic map, data related to structures being passed, commercialized data, and so on. This data can be stored in the database. For example, information provided by/through the first microservice 214 can be stored in (or obtained from) a first portion 236 of the database; information provided by/through the second microservice 216 can be stored in (or obtained from) a second portion 238 of the database; and information provided by/through the third microservice 218 can be stored in (or obtained from) a third portion 240 of the database. The data can be stored in the edge of the network using access and using the traffic into the network.

Provided also is the ability to minimize and streamline the whole service infrastructure. When a service layer on UE device sets up a service-related connectivity, the core adds an initial session to the UE device that gets terminated in SMS session management function in the MAC. That session management function can set up a virtualized session to the MAF to the UE device. Thus, it can geographically divide the amount of information stored at each edge processing unit.

Traditional systems have one edge processing or mobile edge computer center. However, with the disclosed aspects, there are multiple edge processing devices, thus, with any MAF the services can be divided into small parts. Accordingly, there will be a lot less information stored on those database functions, which can facilitate much more control over the flow of the services. This is because when the data is sent into these devices, the data can be continually updated through the service.

In an example related to Augmented Reality (AR), as the user moves throughout a city, the user is receiving street data and the data is changing as the user moves. Accordingly, there can be real time dynamic data, but there is also data that is no longer necessary, sometimes referred to as stale data (e.g., data related to a structure that was viewed two blocks ago. This stale data can be filtered, and the latest information can be utilized for offering the best services. Such functionality can be facilitated by the SDN management function. The SDN management function can evaluate the capacity of the network and the different access that the device can use, both as an access network and a transport back to the network or service layer.

However, a challenge can be that such functionality is not efficient enough for the architecture because the SDN needs to know about not only the regular SDN related information but also the services that are being rendered at the edge of the network. Also needed by the SDN is the information that is needed for efficiently using those services as real time data because different policies could be applied for these services and since the user is moving, these policies can change. Accordingly, there should be a dynamic policy that can work with SDN. Thus, the SDN can predict the service(s) being used and what changes need to be done in order to provide the service.

For example, the user is moving at a certain pace to the center of a city and it is expected that the user will utilize an application to find a parking place or the user is going to movies and buying a ticket. This type of information can be predicted by SDN management function and can optimize the best quality of experience for the users.

The SDN management function can control all these separate functions in the separate MAF. There is an SDN in the MAF, an SDN in a transport layer (not illustrated), and an SDN in the core layer (not illustrated). The SDN management function in the MAC can communicate to the SDNs in the transport layer and/or core layer also in order to offer the most efficient flow of data.

As indicated, the MAFs are distributed (in some cases very distributed). Accordingly, the UE device hands over from one MAF to other MAFs as the UE device moves geographically between the MAFs. The application functions and policy functions and filtering functions all can be instantiated depending on what services are being executed on the UE device. The AF is for a defined application used for the defined service that does not necessary exist currently in the MAF. However, once the UE device moves there (or before the device moves there), the defined application/defined service can be instantiated on the MAF. The PF is a function of the MAF that will be able to give dynamic policies to the sessions or to the services being rendered for the user. The FF decides what information needs to be presented to the user. Thus, the MAF can distinguish between the stale data and dynamic data and does not send all the information to the UE device.

There can also be an SDN management function in the MAC, which can include the intelligence and machine learning and Artificial Intelligence (AI) modeling, which can provide the input to the SDN management function to make it truly intelligent. Thus, the disclosed aspect can not only provide the guidance to distributed SDN in terms of setting up the forwarding but can also take the state and the intelligence from the network and also from the service layer.

The infrastructure is another part of the network that has Radio Intelligence Centers (RICs) that can control the access technology to be used depending on the dynamic policies and what is available at any time for the user (e.g., the UE device) to provide an optimized service experience. Thus, the UE device can move between different access technologies (e.g., Wi-Fi, LTE, 5G, 6G, satellite, and so on). This can coincide with SDN management functions capability to distinguish and decide what access technology will be used at any time.

Figure 3:
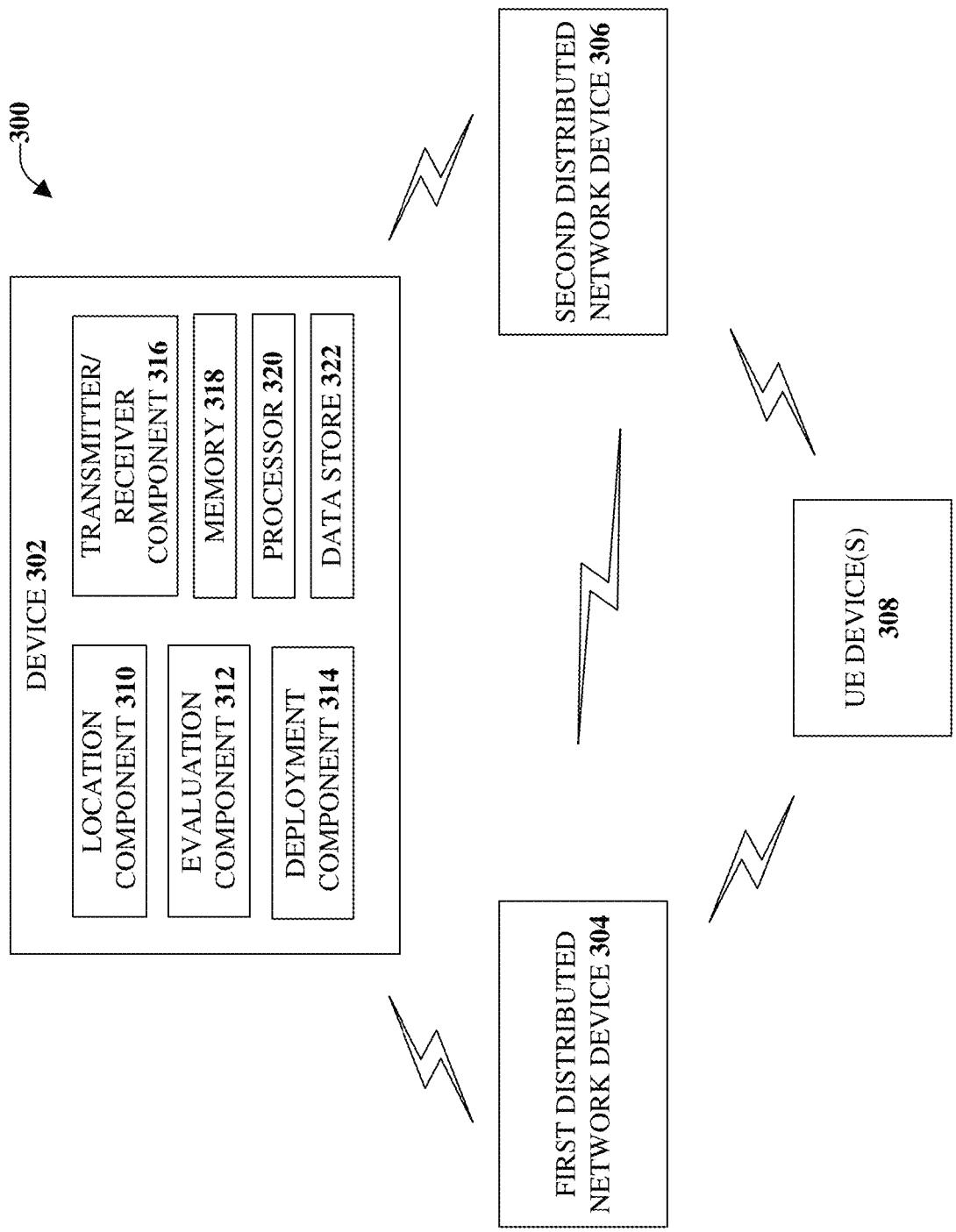
FIG. 3 illustrates an example, non-limiting, communications network that employs decentralized core services in advanced networks in accordance with one or more embodiments described herein.

FIG. 3 illustrates an example, non-limiting, system 300 that employs decentralized core services in advanced networks in accordance with one or more embodiments described herein. Repetitive description of like elements employed in other embodiments described herein is omitted for sake of brevity. The system 300 can comprise one or more of the components and/or functionality of the system 100, the system 200, and vice versa.

The system 300 can comprise a device 302 that can be communicatively coupled to one or more edge computing devices or distributed network devices (e.g., the first MAF 226 and the second MAF 228). In FIG. 3 the distributed network devices are illustrated as a first distributed network device 304 and at least a second distributed network device 306. The first distributed network device 304 and at least the second distributed network device 306 can be selected from a group of distributed network devices that geographically divide an amount of information communicated within the system 300. The first distributed network device 304 and at least the second distributed network device 306 can comprise one or more of the components and/or functionality of the first MAF 226, the second MAF 228, and vice versa.

Also included in the system 300 can be one or more UE devices (e.g., UE device 308) that can be communicatively coupled to the one or more distributed network devices. It is noted that a communications network can have a multitude of distributed network devices located at various locations. Further, the terms first, second, third, and so on as utilized herein are for purposes of distinguishing one or more distributed network devices, one or more UE devices, or other devices, from one another and is not meant to indicate a particular order or placement of such devices.

The system 300 can be configured for facilitating enablement of intelligent service aware access utilizing multi-access edge computing. Aspects of systems (e.g., the system 300 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the device 302 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the device 302 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 3, the device 302 can include a location component 310, an evaluation component 312, a deployment component 314, a transmitter/receiver component 316, at least one memory 318, at least one processor 320, and at least one data store 322. The location component 310 can determine a location of the UE device 308 (or multiple UE devices) within the system 300. For example, the location component 310 can determine whether the UE device is located near (e.g., within a service range or area of) the first distributed network device 304 or near (e.g., within a service range or area of) the second distributed network device 306. According to some implementations, the location component 310 can determine the location of the UE device 308 based on receiving a connection request from the mobile device. For example, the connection request can comprise information indicating a type of the mobile device and the network service.

Further, the location component 310 can determine whether the UE device 308 is moving toward a service range of the first distributed network device 304. According to some implementations, the determination by the location component 310 can be based, at least in part, on an indication that communication of the UE device 308 is to be handed off between distributed network devices. For example, the communication could be handed off from the second distributed network device 306 to the first distributed network device 304, or from the first distributed network device 304 to the second distributed network device 306, or to another device.

In some implementations, the location component 310 can determine the location of the UE device 308 based on various location mechanisms including, but not limited to, Global Positioning System (GPS) capabilities. Such GPS or other location mechanisms can be incorporated with the UE device 308 and information indicative of the UE device 308 location can be provided to the location component 310. Alternatively, or additionally, the location component 310 can determine the location of the UE device 308 based on other information provided by the UE device 308 or provided by other devices (e.g., reports, signal strength information, and so on).

The evaluation component 312 can receive information indicative of a network service utilized by the UE device 308. For example, the network service can be a network service currently executing on the UE device 308 (e.g., actively being used at the UE device 308). The network service can be expected to be executed on the UE device 308 (e.g., not currently being used at the UE device 308 but is scheduled to be used at the UE device 308 soon). In some cases, the network service can be a service for which the UE device 308 has subscribed and which might be executed on the UE device 308 at any time.

With respect to the UE device 308 and the first distributed network device 304, the network service utilized by the UE device 308 could be a network service already instantiated at the first distributed network device 304. For example, the network service could be a network service being used by one or more other UE devices. However, in some implementations, the network service could be a network service not currently instantiated in the first distributed network device 304 (e.g., the network service is unavailable at the first distributed network device 304).

If the network service is already instantiated at the first distributed network device 304, the network service continues to be instantiated at the first distributed network device 304 (e.g., the network service capabilities are not removed from the first distributed network device 304). However, if the network service is not already instantiated at the first distributed network device 304, the deployment component 314 can instantiate the network service at the first distributed network device 304 prior to the UE device 308 entering the service range of the first distributed network device 304. Thus, the first distributed network device 304 can facilitate provision of at least a portion of the decentralized core services to the UE device 308. By instantiating the network service at the first distributed network device 304, the deployment component 314 can instantiate the network service as a microservice offered by the system 300.

According to some implementations, communication of the UE device 308 could be handed off from the second distributed network device 306 to the first distributed network device 304. Thus, the deployment component 314 could deploy a temporary version of the network service to the first distributed network device 304. The temporary version can enable a communication handover of the UE device 308 from the second distributed network device 306 to the first distributed network device 304.

In some implementations, the location component 310 can determine that the UE device 308 has left the service range of the first distributed network device 304. According to this determination, the deployment component 314 could remove the temporary version of the network service from the first distributed network device 304. In a similar manner, the deployment component 314 could remove a temporary version of the network service from the second distributed network device 306. It is noted that the deployment component 314 does not remove the temporary version of the network service if one or more other UE devices are determined to use the network service.

The transmitter/receiver component 316 can be configured to transmit to, and/or receive data from, the first distributed network device 304, the second distributed network device 306, other network devices, and/or other UE devices. Through the transmitter/receiver component 316, the device 302 can concurrently transmit and receive data, can transmit and receive data at different times, or combinations thereof.

The at least one memory 318 can be operatively connected to the at least one processor 320. The at least one memory 318 can store executable instructions that, when executed by the at least one processor 320 can facilitate performance of operations. Further, the at least one processor 320 can be utilized to execute computer executable components stored in the at least one memory 318.

For example, the at least one memory 318 can store protocols associated with facilitating enablement of intelligent service aware access utilizing multiaccess edge computing in advanced networks as discussed herein. Further, the at least one memory 318 can facilitate action to control communication between the device 302, the first distributed network device 304, the second distributed network device 306, other network devices, and/or other UE devices, such that the device 302 can employ stored protocols and/or algorithms to achieve enablement of intelligent service aware access utilizing multiaccess edge in a wireless network as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 320 can facilitate respective analysis of information related to facilitating notification and corrective actions related to endpoint quality of service losses in advanced networks. The at least one processor 320 can be a processor dedicated to analyzing and/or generating information received, a processor that controls one or more components of the device 302, and/or a processor that both analyzes and generates information received and controls one or more components of the device 302.

Further, the term network device is used herein to refer to any type of network node serving mobile devices and/or connected to other network nodes, network elements, or another network node from which the mobile devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

It is noted that the first distributed network device 304, the second distributed network device 306, and the UE device 308 can comprise respective transmitter/receiver components, respective one or more memories, respective one or more transmitters, and respective one or more data stores. However, such components are not illustrated and described for purposes of simplicity.

The various aspects provided herein provide benefits including, but not limited to, the ability to accommodate a seamless and efficient resource distribution to microservices. Another benefit can be the mitigation or reduction of operating expenses of access networks. For example, according to some implementations, the SDN can decide which access technology to use to be most efficient. The SDN can also send the data and filter the data such that only necessary data is sent to the UE device. This can reduce the network traffic load and can reduce operating expenses.

A further benefit includes a reduction or mitigation of the network traffic load according to level of network congestion according to microservice utilization. For example, congestion can be reduced because the microservices can have the ability to decide what access technology will be used according to service level agreements as well as other dynamic policy data.

Yet another benefit includes the ability to coordinate and streamline service-related data from multiple sources. Still another benefit relates to the ability to control employment of simultaneous radio technologies for one or more services. For example, a UE device can be a heads-up display or another display and one or more commercial brokers can determine a location of the UE in order to send tailored information to the UE for multiple purposes.

Further, according to some implementations, simultaneous radio technologies can be utilized. For example, a UE device is located in an area with a lot of network congestion (e.g., a lot of network traffic). The UE device is consuming a large amount of data (e.g., a large amount of data is being downloaded to the UE device). In this example, the UE device is streaming data. Accordingly, the download resource can be handed off to available access technologies (e.g., satellite or MFW radios on the street). Further, the 5G and/or 6G radios can also be utilized for more secure and efficient data communications.

By having the session management function and utilizing the one main session between the core and the UE device, as many virtual sessions connected to different access technologies can be used as desired. Thus, any number of access technologies on a service can be utilized with the disclosed aspects. Traditionally, this cannot be performed. Instead, traditionally there is one session (one access technology) and when the UE device moves from LTE to Wi-Fi, for example, a new session towards wi-fi has to be established and the existing session with LTE has to be terminated. However, with the disclosed aspects, the sessions are terminated on SDN and the virtual sessions are initiated from the SDN towards the UE device. Accordingly, there can be numerous simultaneous sessions.

Figure 4:
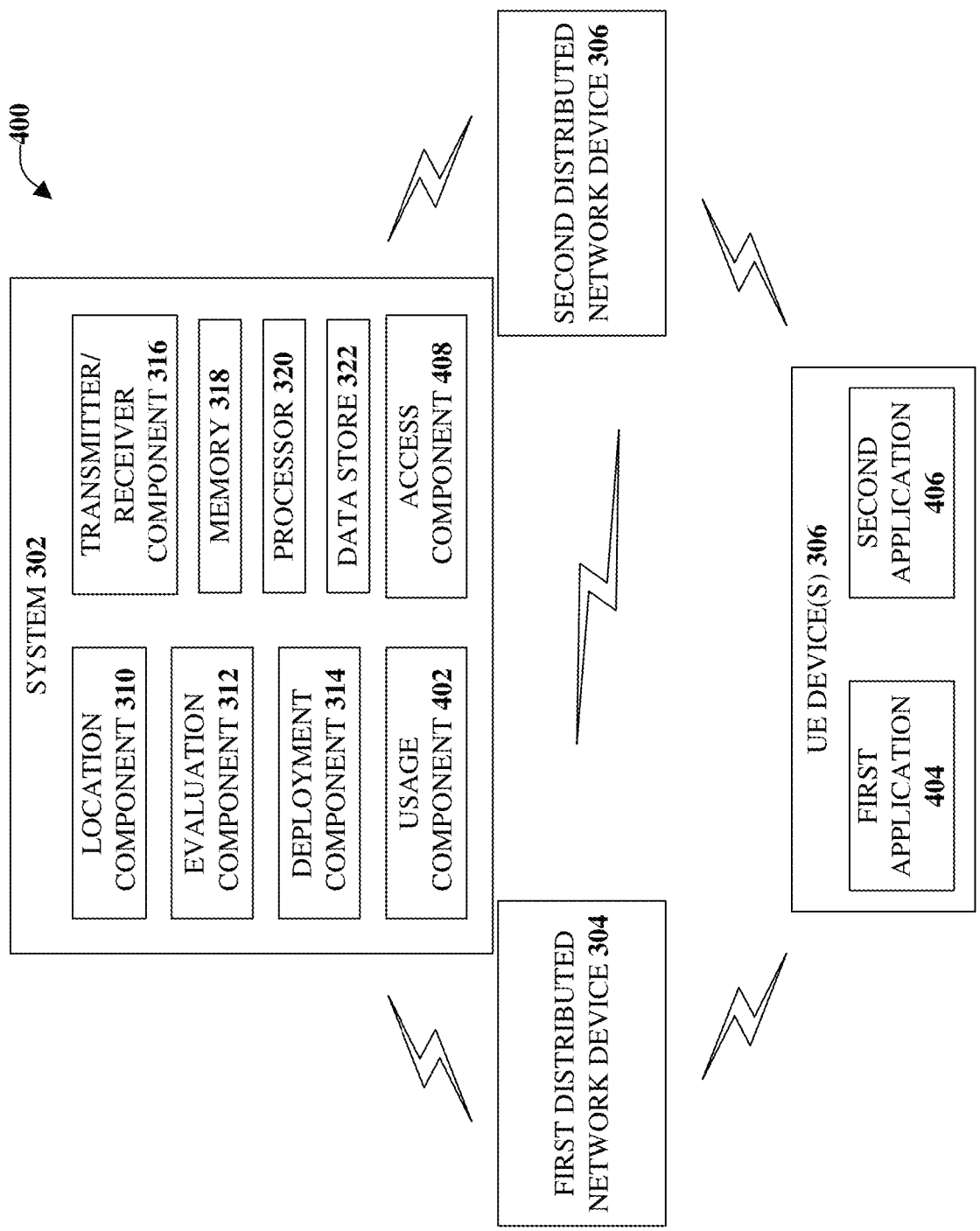
FIG. 4 illustrates an example, non-limiting, communications network that facilitates use of multiple access technologies at substantially the same time by a user equipment device with intelligent service aware access utilizing multiaccess edge computing in accordance with one or more embodiments described herein.

FIG. 4 illustrates an example, non-limiting, system 400 that facilitates use of multiple access technologies at substantially the same time by a UE device with intelligent service aware access utilizing multiaccess edge computing in accordance with one or more embodiments described herein. Repetitive description of like elements employed in other embodiments described herein is omitted for sake of brevity. The system 400 can comprise one or more of the components and/or functionality of the system 100, the system 200, the system 300, and vice versa.

As illustrated, the device 302 can comprise a usage component 402 that can determine a first application 404 and at least a second application 406 are executing on the UE device 308. For example, the first application can be a voice call and the second application can be a streaming video, however, the disclosed aspects are not limited to this example.

An access component 408 can enable a first communication of the first application 404 via a first access technology based on a first microservice employed for the first application 404. Further, the access component 408 can enable a second communication of the second application 406 via a second access technology based on a second microservice employed for the second application. The first access technology and the second access technology can be different access technologies.

By enabling the first communication of the first application 404 and enabling the second communication of the second application 406, the access component 408 can reduce network congestion within the system 400. According to some implementations, to enable the first communication, the access component 408 can enable a first virtual session between the first distributed network device 304 and the UE device 308. Further, to enable the second communication, the access component 408 can enable a second virtual session between the first distributed network device 304 and the UE device 308.

Figure 5:
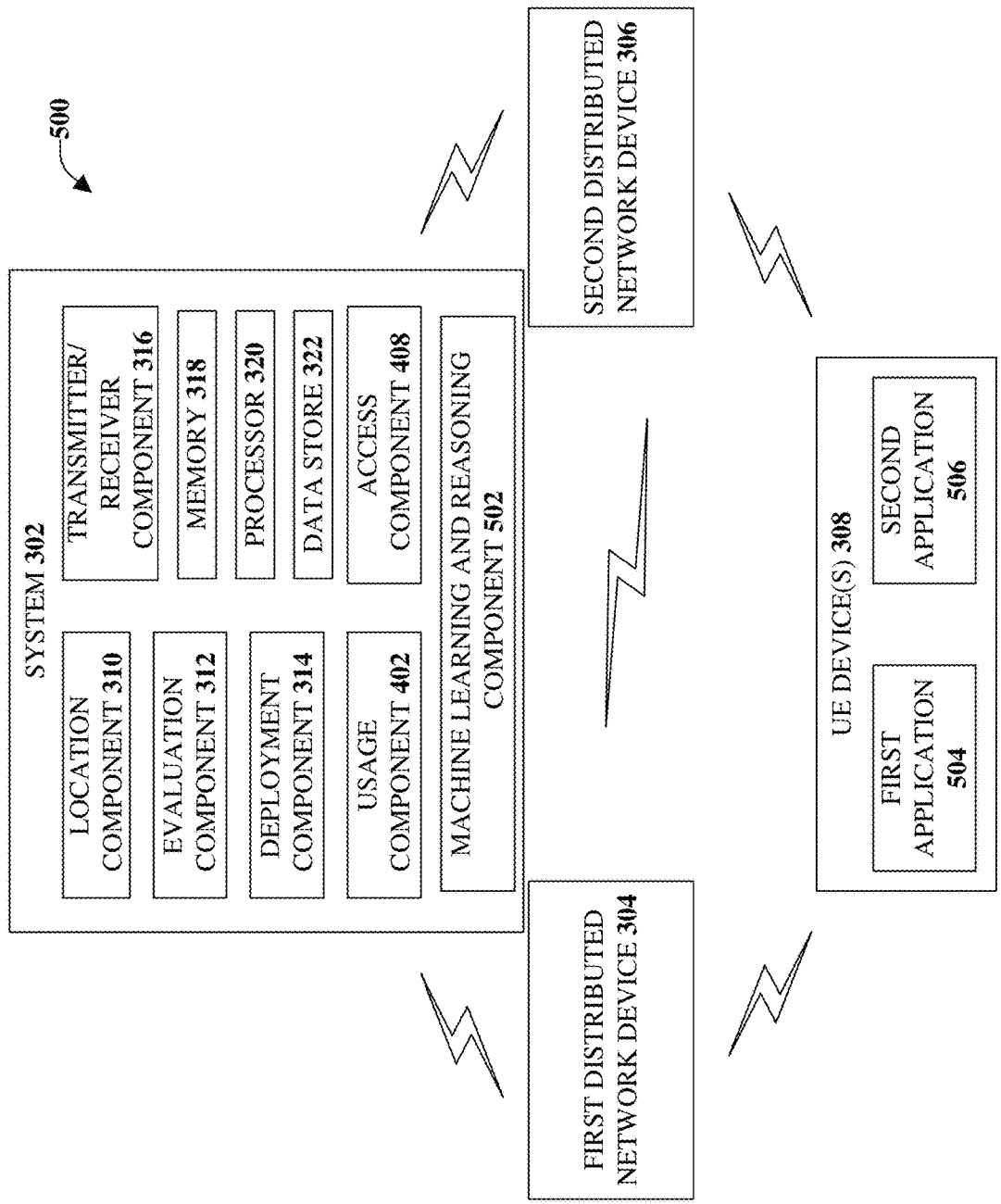
FIG. 5 illustrates an example, non-limiting, system that trains a model and employs automated learning to facilitate one or more of the disclosed aspects in accordance with one or more embodiments described herein.

FIG. 5 illustrates an example, non-limiting, system 500 that trains a model and employs automated learning to facilitate one or more of the disclosed aspects in accordance with one or more embodiments described herein. Repetitive description of like elements employed in other embodiments described herein is omitted for sake of brevity. The system 500 can comprise one or more of the components and/or functionality of the device 302, and vice versa.

The system 500 can comprise a training component that can train a model. For example, the training component can train the model on instantiation of network services, utilization of multiple access technologies, and so on. The model can be trained, by the training component, to detect and resolve the trigger events to a defined confidence level.

The system 500 can comprise a machine learning and reasoning component 502 that can be utilized to automate one or more of the disclosed aspects. The machine learning and reasoning component 502 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 502 can employ principles of probabilistic and decision theoretic inference. Additionally, or alternatively, the machine learning and reasoning component 502 can rely on predictive models constructed using machine learning and/or automated learning procedures. Logic-centric inference can also be employed separately or in conjunction with probabilistic methods.

The machine learning and reasoning component 502 can infer instantiation of one or more network services at one or more distributed network devices. Based on this knowledge, the machine learning and reasoning component 502 can make an inference based on which network services to implement, where to implement the network services, and when to implement the network services.

As used herein, the term "inference" refers generally to the process of reasoning about or inferring states of a system, a component, a module, an environment, and/or devices from a set of observations as captured through events, reports, data and/or through other forms of communication. Inference can be employed to identify a specific condition, modification, and/or effect, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with facilitating enablement of intelligent service aware access utilizing multiaccess edge computing) can employ various artificial intelligence-based schemes for carrying out various aspects thereof. For example, a process for determining if a particular network service should be deployed on a distributed network device can be enabled through an automatic classifier system and process.

A classifier is a function that maps an input attribute vector, x=(x1, x2, x3, x4, xn), to a confidence that the input belongs to a class. In other words, f(x)=confidence(class). Such classification can employ a probabilistic and/or statistical-based analysis (e.g., factoring into the analysis utilities and costs) to provide a prognosis and/or infer one or more actions that should be employed to determine what action to be automatically performed.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by retaining a database of triggers, historical changes, and impacts). For example, SVMs can be configured through a learning or training phase within a classifier constructor and feature selection module. Thus, a classifier(s) can be used to automatically learn and perform a number of functions, including but not limited to referring to historical information for the implementation of network services, deployment of network services, and so forth.

Methods that can be implemented in accordance with the disclosed subject matter will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 6:
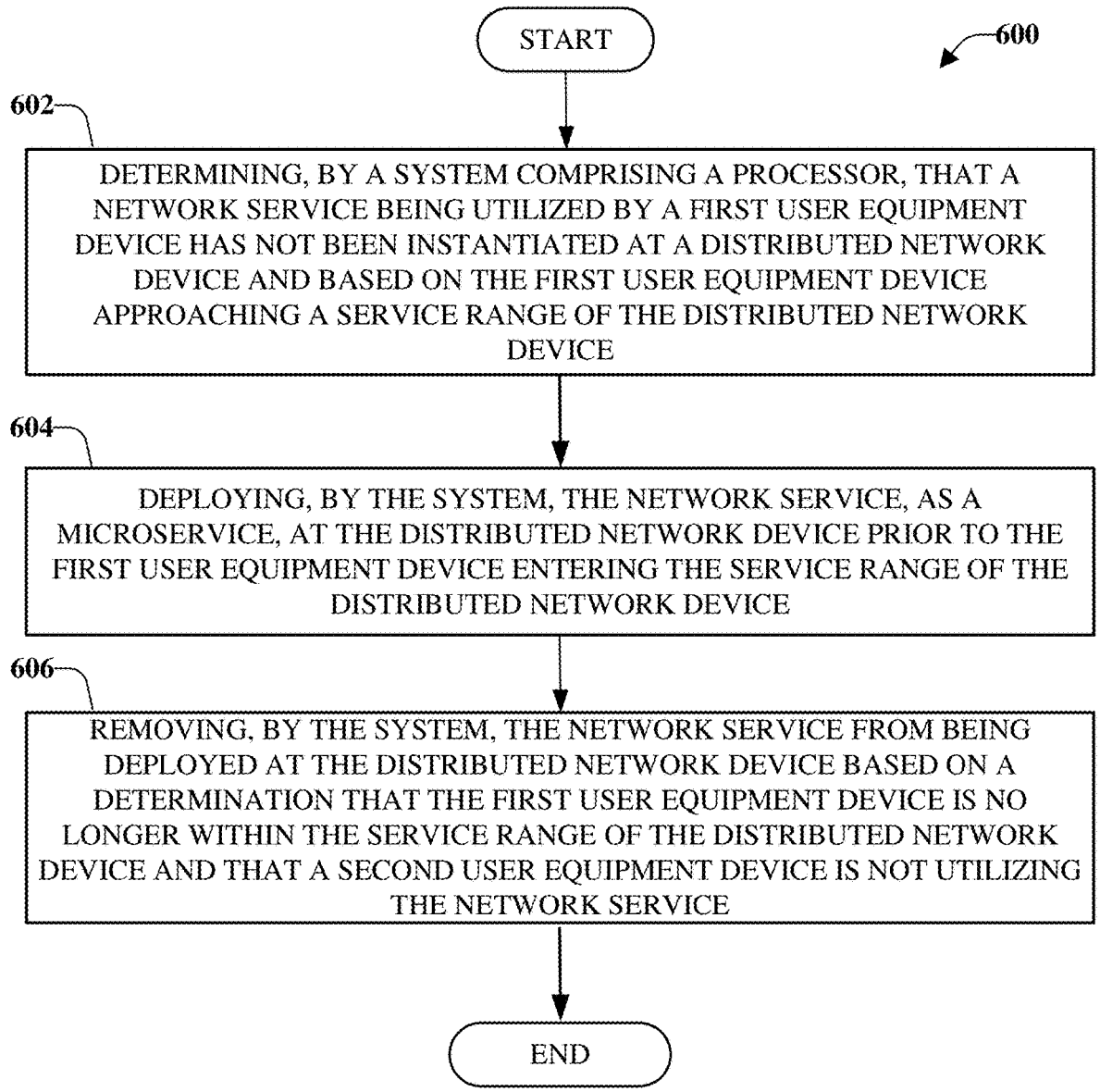
FIG. 6 illustrates a flow diagram of an example, non-limiting, computer-implemented method for facilitating enablement of intelligent service aware access utilizing multiaccess edge computing in advanced networks in accordance with one or more embodiments described herein.

FIG. 6 illustrates a flow diagram of an example, non-limiting, computer-implemented method 600 for facilitating enablement of intelligent service aware access utilizing multiaccess edge computing in advanced networks in accordance with one or more embodiments described herein. Repetitive description of like elements employed in other embodiments described herein is omitted for sake of brevity.

In some implementations, a system comprising a processor can perform the computer-implemented method 600 and/or other methods discussed herein. In other implementations, a device comprising a processor can perform the computer-implemented method 600 and/or other methods discussed herein. In other implementations, a machine-readable storage medium, can comprise executable instructions that, when executed by a processor, facilitate performance of operations, which can be the operations discussed with respect to the computer-implemented method 600 and/or other methods discussed herein. In further implementations, a machine readable or computer readable storage device comprising executable instructions that, in response to execution, cause a system comprising a processor to perform operations, which can be operations discussed with respect to the computer-implemented method 600 and/or other methods discussed herein.

The computer-implemented method 600 starts, at 602, when a determination is made that a network service being utilized by a first user equipment device has not been instantiated at a distributed network device. The determination can also be made based on the first user equipment device approaching a service range of the distributed network device.

The network service can be deployed at the distributed network device prior to the first user equipment device entering the service range of the distributed network device, at 604 of the computer-implemented method 600. The network service can be deployed as a microservice. In an example, deploying the network service can comprise enabling at least some of decentralized core services to the first user equipment device based on temporarily deploying, by the system, the network service at the distributed network device.

According to some implementations, there can be a handover of communication of the mobile device between distributed network devices. For example, there can be a communication handover from a second distributed network device to the first distributed network device. Thus, the communication handover of the first user equipment device can be facilitated from a second distributed network device to the first distributed network device based on deploying of the network service prior to the first user equipment device entering the service range of the first distributed network device.

Further, at 606, the network service can be removed from being deployed at the distributed network device based on a determination that the first user equipment device is no longer within the service range of the distributed network device. The removal of the network service can also be based on a determination that other user equipment devices are not utilizing the network service.

Figure 7:
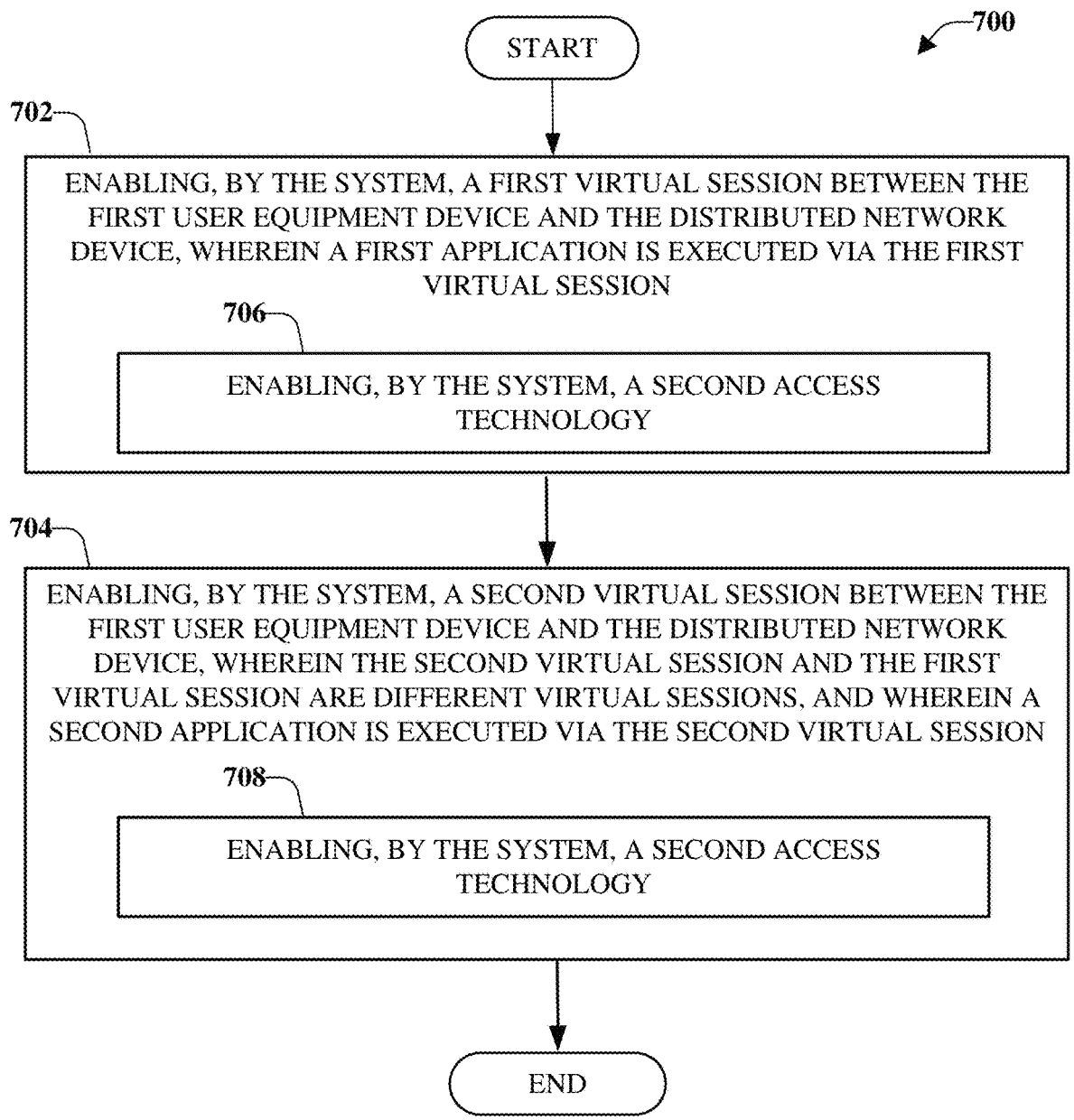
FIG. 7 illustrates a flow diagram of an example, non-limiting, computer-implemented method for facilitating utilization of multiple access technologies at substantially the same time in advanced networks in accordance with one or more embodiments described herein.

FIG. 7 illustrates a flow diagram of an example, non-limiting, computer-implemented method 700 for facilitating utilization of multiple access technologies at substantially the same time in advanced networks in accordance with one or more embodiments described herein. Repetitive description of like elements employed in other embodiments described herein is omitted for sake of brevity.

At 702 of the computer-implemented method 700, a first virtual session between a first user equipment device and a distributed network device can be enabled. The first application can be executed via the first virtual session. Further, at 704, a second virtual session can be enabled between the first user equipment device and the distributed network device. The second virtual session and the first virtual session can be different virtual sessions. Further, the second application can be executed via the second virtual session.

According to some implementations, enabling the first virtual session can comprise enabling a first access technology, at 706. Further, enabling the second virtual session can comprise enabling a second access technology, at 708. For example, enabling the second virtual session can comprise enabling a second access technology different from the first access technology. The first access technology and the second access technology can be concurrently employed by the first user equipment device.

Figure 8:
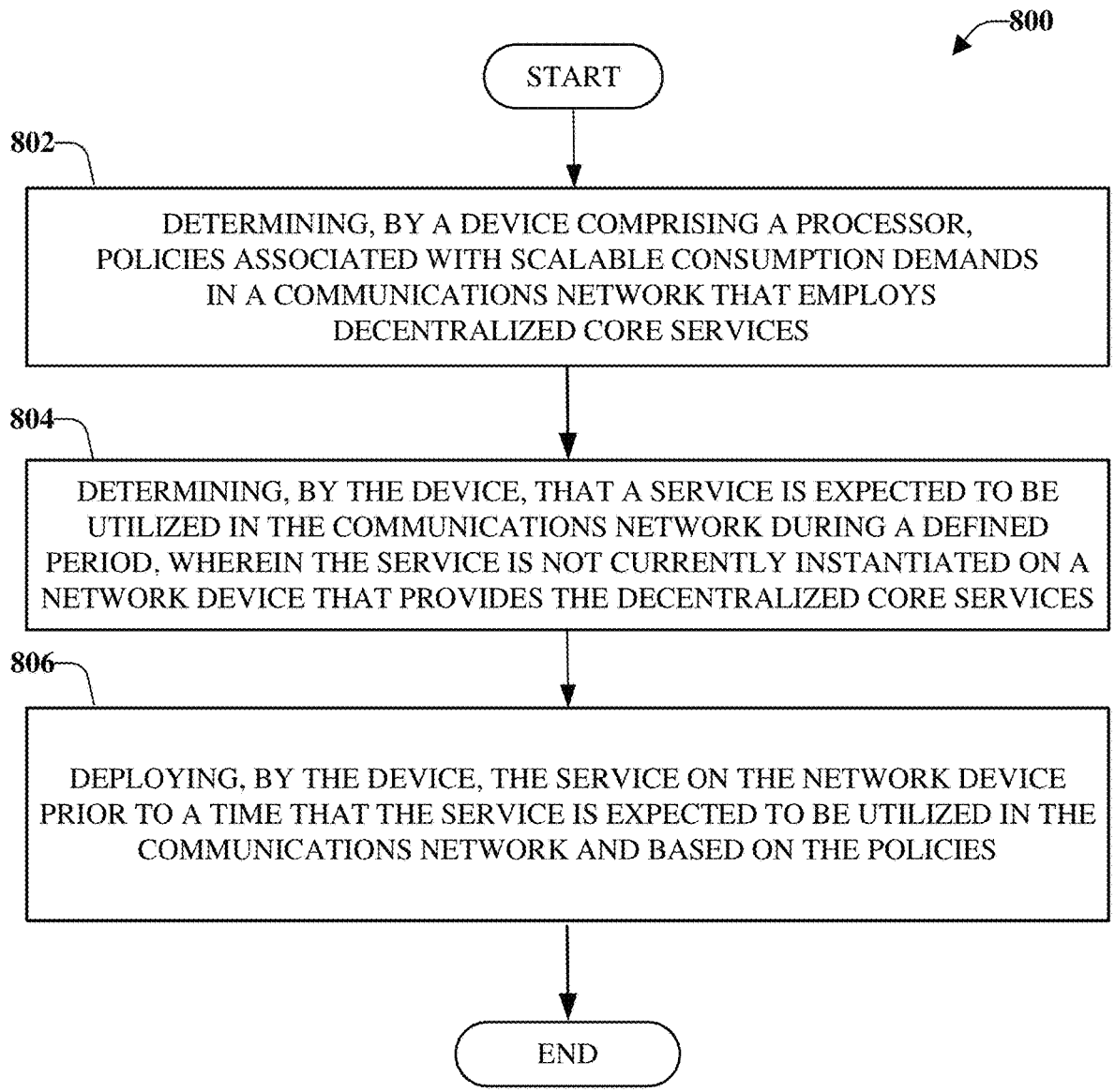
FIG. 8 illustrates a flow diagram of an example, non-limiting, computer-implemented method 800 for facilitating enablement of intelligent service aware access utilizing multiaccess edge computing in advanced networks in accordance with one or more embodiments described herein.

FIG. 8 illustrates a flow diagram of an example, non-limiting, computer-implemented method 800 for facilitating enablement of intelligent service aware access utilizing multiaccess edge computing in advanced networks in accordance with one or more embodiments described herein. Repetitive description of like elements employed in other embodiments described herein is omitted for sake of brevity.

At 802 of the computer-implemented method 800 policies associated with scalable consumption demands in a communications network that employs decentralized core services can be determined. The scalable consumption demands can comprise microservices available within the communications network.

It can be determined, at 804, that a service is expected to be utilized in the communications network during a defined period. The service can be a service that is not currently instantiated on a network device that provides the decentralized core services. The network device can provide at least a group of the decentralized core services to the user equipment device.

For example, determining that the service is expected to be utilized in the communications network during the defined period can comprise determining a user equipment device is moving within a service range of the network device. Further, determining that the service is expected to be utilized in the communications network during the defined period also can comprise receiving information indicative of a network service utilized by the user equipment device, wherein the network service is determined to be the service that is not currently instantiated on the network device.

Further, at 806 of the computer-implemented method 800, the service can be deployed on the network device prior to a time that the service is expected to be utilized in the communications network and based on the policies, Described herein are systems, methods, articles of manufacture, and other embodiments or implementations that can facilitate enablement of intelligent service aware access utilizing multiaccess edge computing in advanced networks. Facilitating notification and corrective actions related to endpoint quality of service losses can be implemented in connection with any type of device with a connection to the communications network (e.g., a mobile handset, a computer, a handheld device, etc.) any Internet of things (IoT) device (e.g., toaster, coffee maker, blinds, music players, speakers, water meter, etc.), and/or any connected vehicles (e.g., cars, airplanes, boats, space rockets, and/or other at least partially automated vehicles (e.g., drones), and so on). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

To meet the huge demand for data centric applications, 4G standards can be applied to 5G, also called New Radio (NR) access. The 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to Long Term Evolution (LTE).

Multiple Input, Multiple Output (MIMO) systems can significantly increase the data carrying capacity of wireless systems. For these reasons, MIMO is an integral part of the third and fourth generation wireless systems (e.g., 3G and 4G). In addition, 5G systems also employ MIMO systems, which are referred to as massive MIMO systems (e.g., hundreds of antennas at the transmitter side (e.g., network) and/receiver side (e.g., user equipment). With a $(N_t, N_r)$ system, where $N_t$ denotes the number of transmit antennas and Nr denotes the receive antennas, the peak data rate multiplies with a factor of $N_t$ over single antenna systems in rich scattering environment.

In addition, advanced networks, such as a 5G network can be configured to provide more bandwidth than the bandwidth available in other networks (e.g., 4G network, 5G network). A 5G network can be configured to provide more ubiquitous connectivity. In addition, more potential of applications and services, such as connected infrastructure, wearable computers, autonomous driving, seamless virtual and augmented reality, "ultra-high-fidelity" virtual reality, and so on, can be provided with 5G networks. Such applications and/or services can consume a large amount of bandwidth. For example, some applications and/or services can consume about fifty times the bandwidth of a high-definition video stream, Internet of Everything (IoE), and others. Further, various applications can have different network performance requirements (e.g., latency requirements and so on).

Cloud Radio Access Networks (cRAN) can enable the implementation of concepts such as SDN and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 9:
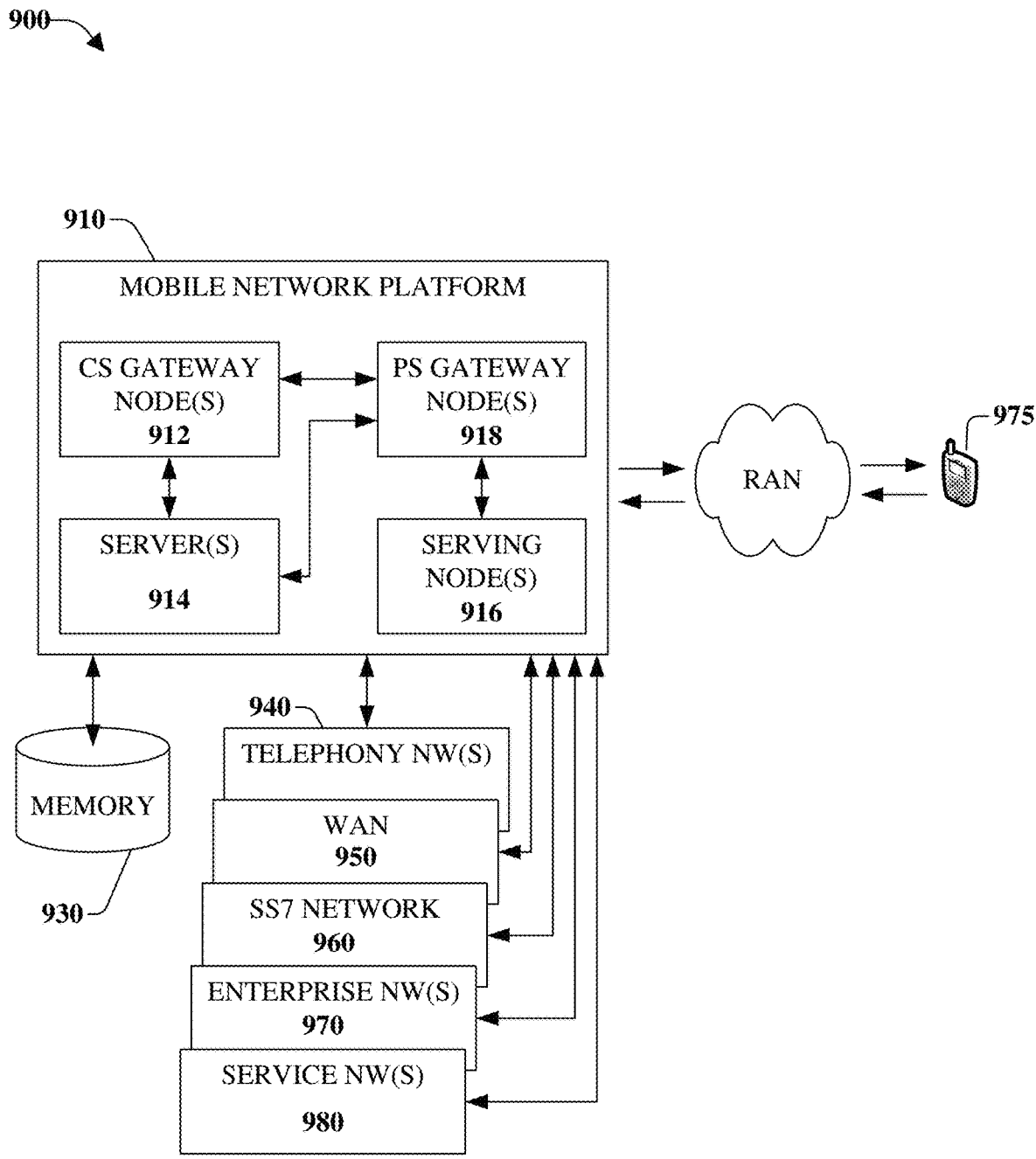
FIG. 9 illustrates an example block diagram of a non-limiting embodiment of a mobile network platform in accordance with various aspects described herein.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., Internet protocol (IP), frame relay, asynchronous transfer mode (ATM) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks such as telephony network(s) 940 (e.g., public switched telephone network (PSTN), or public land mobile network (PLMN)) or a signaling system #7 (SS7) network 960. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication. Mobile network platform 910 can also include the MMEs, HSS/PCRFs, SGWs, and PGWs disclosed herein.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) such as IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless network platform 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
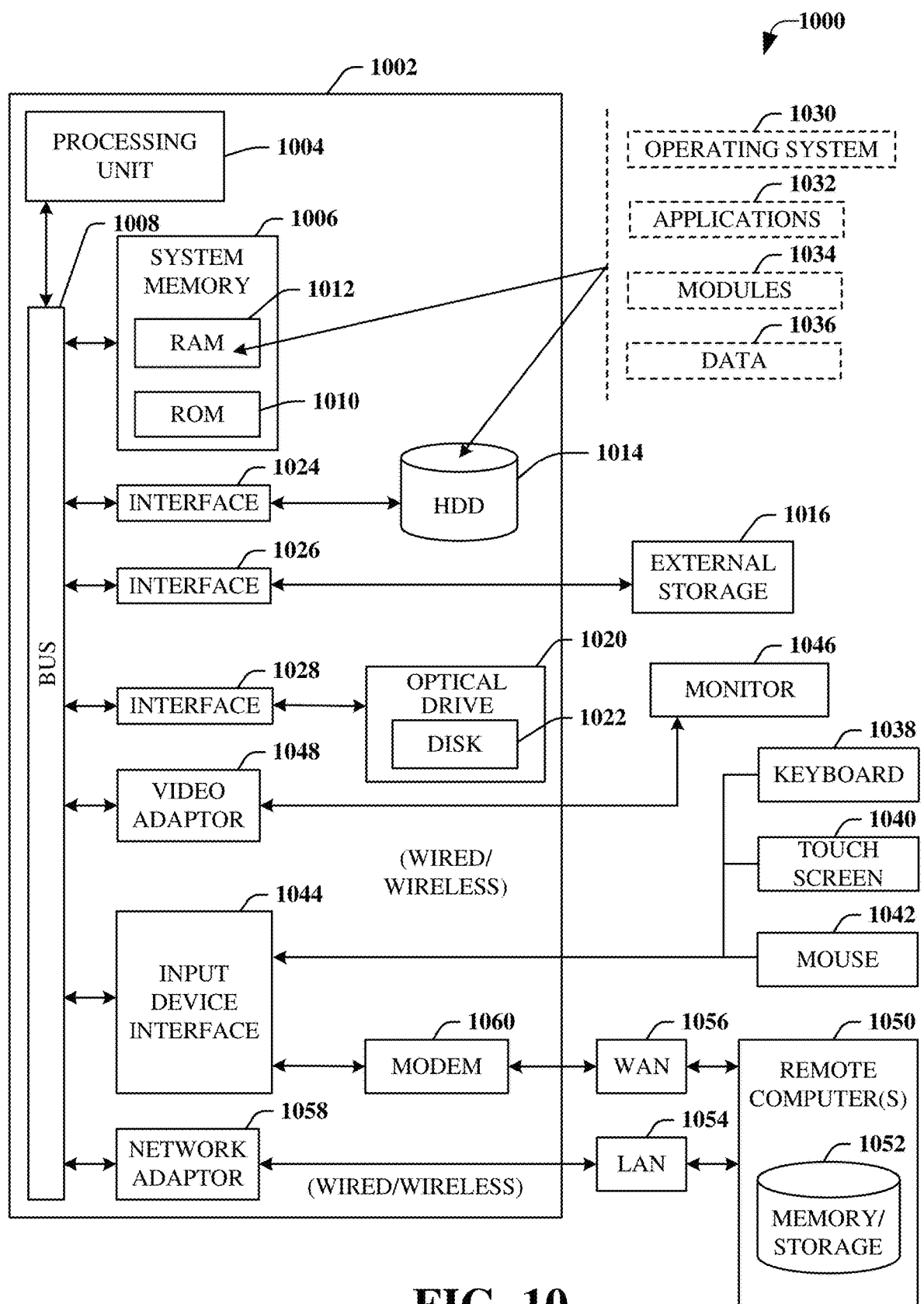
FIG. 10 illustrates an example block diagram of an example computer operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

According to some implementations, a machine-readable storage medium executable instructions that, when executed by a processor, facilitate performance of operations. The operations can comprise determining a trigger event has occurred. The trigger event can indicate a quality of service associated with a device fails to satisfy a defined quality of service level. The operations also can comprise ascertaining a type of application executing on the device. In addition, the operations can comprise determining that a movement of the device from a first location to a second location is expected to cause the quality of service associated with the device to satisfy the defined quality of service level Further, the operations can comprise facilitating an output, at the device, of information indicative of recommended routes from the first location to the second location.

Further to the above implementations, the first location can comprise a first latency amount and the second location can comprise a second latency amount. Thus, the operations can comprise selecting the second location based on the second latency amount being less than the first latency amount and based on the type of application executing on the device being categorized as a time sensitive application.

According to alternative, or additional, implementations, the first location can comprise a first voice quality level and the second location can comprise a second voice quality level. Thus, the operations can comprise selecting the second location based on the second voice quality level being a better voice quality than the first voice quality level and based on the type of application executing on the device being categorized as a non-time sensitive application.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an internal HDD 1014. The internal HDD 1014, external storage device(s) 1016 and optical disk drive 1020 can be connected to the system bus 1008 by an HDD interface 1024, an external storage interface 1026 and an optical drive interface 1028, respectively. The HDD interface 1024 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for application programs 1032. Runtime environments are consistent execution environments that allow application programs 1032 to run on any operating system that includes the runtime environment. Similarly, operating system 1030 can support containers, and application programs 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1094 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, comprising:
determining that a user equipment is moving toward a service range of first network equipment associated with a first distributed network, wherein the first distributed network is included in a communications network that employs decentralized core services;
receiving information indicative of a network service utilized by the user equipment, wherein the network service is determined to be a service that is unavailable via the first distributed network; and
instantiating the network service at the first network equipment prior to the user equipment entering the service range of the first network equipment, wherein the first network equipment facilitates provision of at least a portion of the decentralized core services to the user equipment, wherein the instantiating comprises deploying a temporary version of the network service to the first network equipment, and wherein the temporary version enables a communication handover by the user equipment from second network equipment, associated with a second distributed network, to the first network equipment.

2. The system of claim 1, wherein the operations further comprise:
determining that the user equipment has left the service range of the first network equipment associated with the first distributed network; and
removing the temporary version of the network service from the first network equipment associated with the first distributed network.

3. The system of claim 1, wherein the instantiating comprises instantiating the network service as a microservice offered via the communications network.

4. The system of claim 1, wherein the operations further comprise:
determining that a first application and a second application are executing on the user equipment;
enabling a first communication of the first application via a first access technology based on a first microservice employed for the first application; and
enabling a second communication of the second application via a second access technology, different from the first access technology, based on a second microservice employed for the second application.

5. The system of claim 4, wherein the operations further comprise reducing network congestion within the communications network based on the enabling of the first communication of the first application and the enabling of the second communication of the second application.

6. The system of claim 4, wherein the enabling of the first communication comprises enabling a first virtual session between the first network equipment associated with the first distributed network and the user equipment, and wherein the enabling of the second communication comprises enabling a second virtual session between the first network equipment associated with the first distributed network and the user equipment.

7. The system of claim 1, wherein the first network equipment associated with the first distributed network is selected from a group of network equipment that geographically divide an amount of information communicated within the communications network, wherein the group of network equipment comprises the first network equipment and the second network equipment, and wherein the group of distributed networks comprise the first distributed network and the second distributed network.

8. The system of claim 1, wherein the first network equipment associated with the first distributed network comprises a software defined networking management function.

9. The system of claim 1, wherein the determining is based on receiving a connection request from the user equipment, and wherein the connection request comprises information indicating a type of the user equipment and the network service.

10. The system of claim 1, wherein the first network equipment associated with the first distributed network comprises an edge computing device.

11. A method, comprising:
determining, by a system comprising a processor, that a user equipment is moving toward a service range of first distributed network equipment;
determining, by the system, that a network service utilized by the user equipment is not available at the first distributed network equipment based on received information indicative of the network service; and
instantiating, by the system, the network service at the first distributed network equipment based on deployment of a temporary version of the network service at the first distributed network equipment and prior to the user equipment entering the service range of the first distributed network equipment, wherein the temporary version enables a communication handover of the user equipment from second distributed network equipment to the first distributed network equipment, wherein the first distributed network equipment and the second distributed network equipment are included in a communications network that employs decentralized core services, and wherein the first distributed network equipment facilitates provision of at least a portion of the decentralized core services to the user equipment.

12. The method of claim 11, further comprising:
removing, by the system, the temporary version of the network service from the first distributed network equipment based on a determination that the user equipment has left the service range of the first distributed network equipment.

13. The method of claim 11, wherein the instantiating comprises instantiating the network service as a microservice.

14. The method of claim 11, further comprising:
enabling, by the system, a first communication of a first application executing on the user equipment via a first access technology based on a first microservice employed for the first application; and
enabling a second communication of a second application executing on the user equipment via a second access technology, different from the first access technology, based on a second microservice employed for the second application.

15. The method of claim 14, wherein network congestion is reduced as a result of the enabling of the first communication of the first application and the enabling of the second communication of the second application.

16. The method of claim 14, wherein the enabling of the first communication comprises enabling a first virtual session between the first distributed network equipment and the user equipment, and wherein the enabling of the second communication comprises enabling a second virtual session between the first distributed network equipment and the user equipment.

17. A non-transitory machine-readable medium, comprising executable instructions that, when executed by a processor, facilitate performance of operations, comprising:
determining that a user equipment is moving toward a service range of first distributed network equipment;
determining that a network service utilized by the user equipment is not available via the first distributed network equipment based on received information indicative of the network service; and
instantiating the network service via the first distributed network equipment based on deployment of a temporary version of the network service via the first distributed network equipment and prior to the user equipment entering the service range of the first distributed network equipment, wherein the temporary version enables a connection transfer of the user equipment from second distributed network equipment to the first distributed network equipment, wherein the first distributed network equipment and the second distributed network equipment are included in a communications network that employs decentralized core services, and wherein the first distributed network equipment facilitates provisioning of at least a portion of the decentralized core services to the user equipment.

18. The non-transitory machine-readable medium of claim 17, wherein the operations further comprise:
removing the temporary version of the network service from the first distributed network equipment based on a determination that the user equipment has exited the service range of the first distributed network equipment.

19. The non-transitory machine-readable medium of claim 17, wherein the operations further comprise:
enabling a first communication of a first application executing on the user equipment via a first access technology based on a first microservice employed for the first application; and
enabling a second communication of a second application executing on the user equipment via a second access technology, different from the first access technology, based on a second microservice employed for the second application, wherein the enabling of the first communication of the first application and the enabling of the second communication of the second application reduce network congestion according to a defined network congestion metric.

20. The non-transitory machine-readable medium of claim 17, wherein the operations further comprise:
enabling a first communication of a first application executing on the user equipment via a first access technology based on a first microservice employed for the first application, wherein the enabling of the first communication comprises enabling a first virtual session between the first distributed network equipment and the user equipment; and
enabling a second communication of a second application executing on the user equipment via a second access technology, different from the first access technology, based on a second microservice employed for the second application, wherein the enabling of the second communication comprises enabling a second virtual session between the first distributed network equipment and the user equipment.

* * * * *